United States Patent [19]

Tinelli

[11] Patent Number: 4,570,038

[45] Date of Patent: Feb. 11, 1986

[54] SANITARY COVER FOR TELEPHONES AND THE LIKE

[76] Inventor: Frank Tinelli, 40979 Fremont Blvd. #6, Fremont, Calif. 94538

[21] Appl. No.: 581,914

[22] Filed: Feb. 21, 1984

[51] Int. Cl.[4] .......................... H04R 1/12; H04M 1/17

[52] U.S. Cl. .......................... 179/185

[58] Field of Search .......................... 179/185, 184, 187

[56] References Cited

U.S. PATENT DOCUMENTS

| | | | |
|---|---|---|---|
| 2,507,375 | 5/1950 | Hartwell et al. | 179/185 |
| 2,607,862 | 8/1952 | Panken | 179/185 |
| 2,669,610 | 2/1954 | Dent | 179/185 |
| 3,148,249 | 9/1964 | King | 179/185 |
| 3,169,171 | 2/1965 | Wachs et al. | 179/185 |
| 3,299,207 | 1/1967 | Cooke | 179/187 |
| 3,962,555 | 6/1976 | Efaw | 179/185 |

FOREIGN PATENT DOCUMENTS

| | | | |
|---|---|---|---|
| 475857 | 4/1915 | France | 179/185 |

*Primary Examiner*—Gene Z. Rubinson
*Assistant Examiner*—Danita R. Byrd
*Attorney, Agent, or Firm*—Robert Charles Hill

[57] ABSTRACT

Multiple embodiments of a sanitary cover for use on telephones and the like are disclosed wherein the cover includes a sound permeable or perforated element adapted for overlapping engagement with a sound transmitting portion of the telephone to prevent user contact therewith, various types of retainer means being combined with the sound permeable element for replaceably securing it in place upon the telephone. The sound permeable element preferably comprises anti-microbial material for more completely preventing transfer of bacteria or the like from the telephone to the user. A preferred retainer construction for securing the cover in place upon a common type of telephone consists of an annular flange for slip-fit engagement with the sound transmitting portion of the telephone.

2 Claims, 7 Drawing Figures

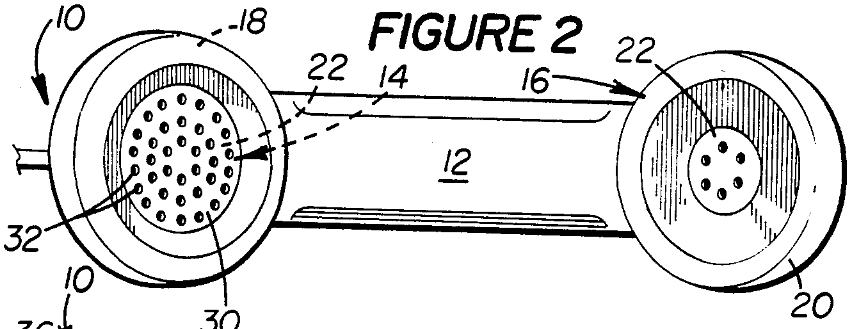
FIGURE 2
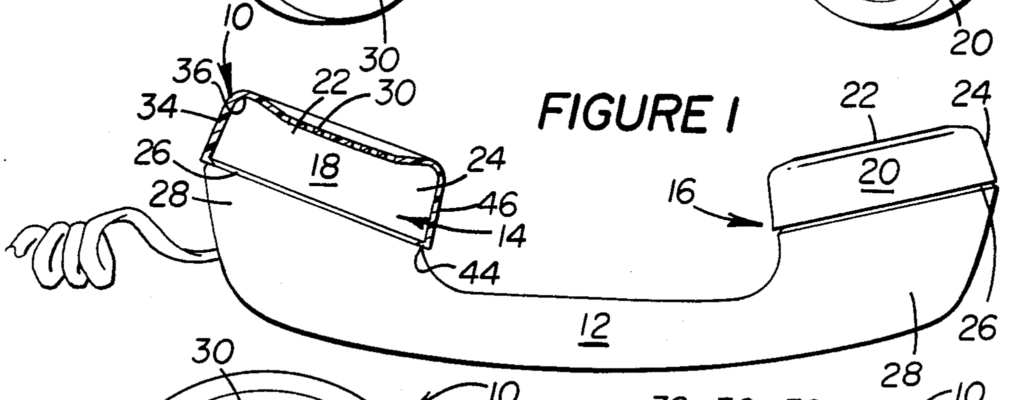
FIGURE 1
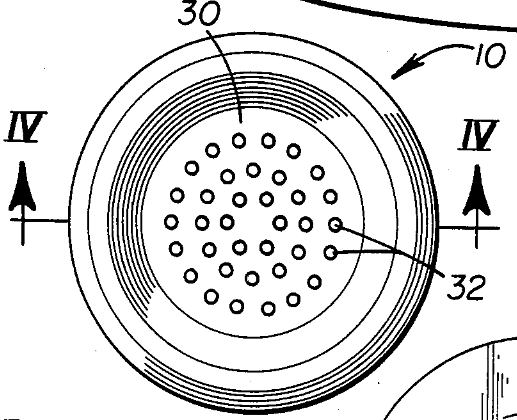
FIGURE 3
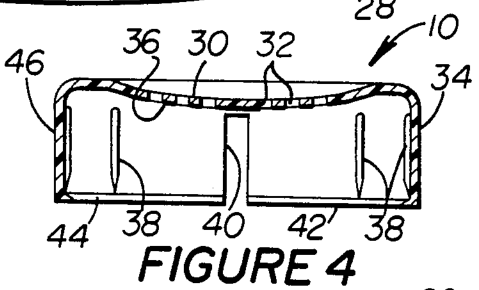
FIGURE 4
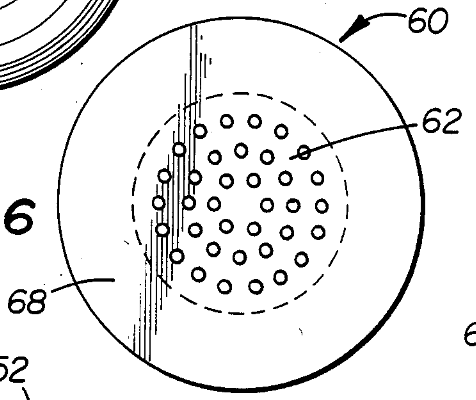
FIGURE 6
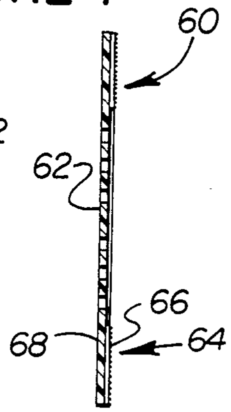
FIGURE 7
FIGURE 5
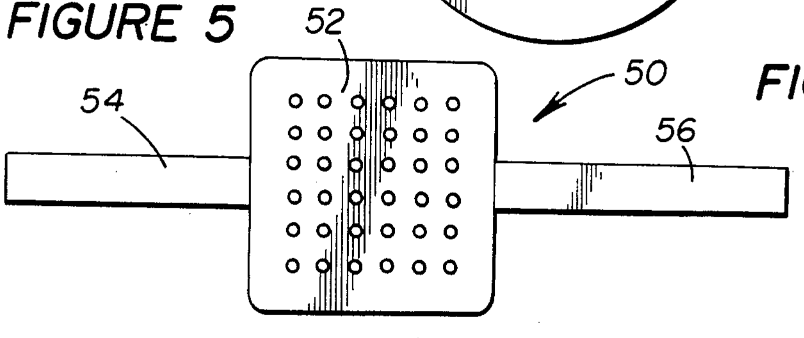

SANITARY COVER FOR TELEPHONES AND THE LIKE

BACKGROUND OF THE INVENTION

The present invention relates to a sanitary cover for use on telephones and the like and more particularly to such a cover which is adapted for replaceable engagement upon a sound transmitting portion of a telephone for preventing user contact therewith.

The invention recognizes that telephone users commonly use telephones which are generally accessible to the public at large or at least to a substantial portion thereof. For example, many telephone conversations are carried on from telephone booths, hotel rooms, reception areas or offices where the telephone user has no way of knowing the indentity of previous users of the telephone equipment.

Accordingly, the telephone user may necessarily come into undesirably close contact with portions of the telephone equipment which are either non-hygienic or may carry the risk of transferring harmful bacteria or the like to the user. In particular, the user tends to come into close contact with both the mouthpiece and earpiece of the telephone. If a prior user of the telephone were a carrier of bacteria associated with a cold, flu or disease, the user might unnecessarily be exposed to contact with the undesirable bacteria.

The invention further recognizes that it is often difficult to adequately clean the telephone equipment in order to insure against transmission of any such bacteria. Accordingly, there has been found to remain a need for a cover which can be used in connection with telephones available to the public or a substantial portion of the public in order to prevent the user from contacting undesirable bacteria or the like.

SUMMARY OF THE INVENTION

It is therefore an object of the present invention to provide a sanitary cover which can be used in conjunction with telephones accessible to the public or a portion thereof for preventing the transfer of undesirable bacteria.

It is a further object of the invention to provide such a sanitary cover adapted for use on sound transmitting portions of telephones and the like, the cover preferably comprising a sound permeable element adapted for overlapping engagement with the sound transmitting portion of the telephone, for example either the mouthpiece or earpiece, in order to prevent user contact therewith, the cover also preferably comprising retainer means for replaceably securing the sound permeable element in place upon the telephone.

It is yet another object of the invention to provide such a sanitary cover wherein at least the sound permeable element comprises anti-microbial material for preventing transfer of bacteria or the like from the telephone to the user. Preferably, the anti-microbial material is impregnated within the sound permeable element itself. For example, the sound permeable element either alone or in combination with other portions of the cover may be formed from flexible plastic with the anti-microbial material being impregnated therein.

It is also an object of the invention to provide such a sanitary cover wherein the retainer means is integrally formed with the sound permeable element and comprises an annular flange adapted to fit over the sound transmitting portion of the telephone. Such a construction permits the sanitary cover to be removed and reused by the user.

Additional objects and advantages of the invention are made apparent in the following description having reference to the accompanying drawing.

BRIEF DESCRIPTION OF THE DRAWING

FIG. 1 is a side view in elevation of a typical handset found on many conventional telephones, the handset including both a mouthpiece and earpiece for transmitting sound either from or to the user, the mouthpiece and a sanitary cover constructed to the present invention being shown in section.

FIG. 2 is a plan view of the handset of FIG. 1 to better illustrate its sound transmitting portions.

FIG. 3 is a plan view of the sanitary cover illustrated in FIG. 1.

FIG. 4 is a view taken along section line IV—IV of FIG. 3.

FIG. 5 is a view of another embodiment of a sanitary cover constructed in accordance with the present invention adaptable for use with telephones having a variety of shapes.

FIG. 6 is a plan view of a simplified embodiment of the sanitary cover of the invention.

FIG. 7 is a side view of the sanitary cover of FIG. 6.

DESCRIPTION OF THE PREFERRED EMBODIMENT

Referring now to the drawing and particularly to FIG. 1, the present invention is directed toward a sanitary cover of the type generally indicated at 10 for use on sound transmitting portions of telephones such as the handset indicated at 12 and other similar devices. The sanitary cover 10 is particularly contemplated to provide a sound permeable elenment as described above for overlapping engagement with sound transmitting portions of the telephone in order to prevent user contact therewith. At the same time, as will be described in greater detail below, the sanitary cover 10 includes retainer means adapted for releasably or replaceably securing the sanitary cover in place upon the telephone.

Continuing with reference to FIGS. 1 and 2, the embodiment of the sanitary cover of the present invention as generally indicated at 10 is particularly suited for use with sound transmitting portions of the telephone handset 12 which is of a type commonly encountered in many public areas.

More particularly, the handset 12 is the only portion of the telephone which is illustrated since it is the portion of the telephone with which the sanitary cover 10 of the present invention is directly employed. The handset 12 includes sound transmitting portions at each end in the form of a mouthpiece 14 for transmitting information spoken by the user and an earpiece 16 adapted for transmitting sound to the user.

During use of the telephone, both of these sound transmitting portions 14 and 16 come into intimate contact with the user and thus may be capable of undesirably transferring bacteria or the like resulting from previous use of the telephone by others. Accordingly, the sanitary cover 10 is adapted for being rapidly slipped into place upon the telephone prior to use. As will be made more apparent below, the sanitary cover 10 may be left in place upon the telephone especially if the user plans to use the same telephone again or the cover 10 may be rapidly removed from the telephone and saved for reuse in another location with another similar telephone.

Before describing the sanitary cover 10 in detail, it is also noted that each of the sound transmitting portions 14 and 16 of the handset 12 are formed with similar adapters 18 and 20 which are of substantially similar shape. Accordingly, similar or identical sanitary covers 10 may be used in conjunction with either the mouthpiece 14 or earpiece 16.

As may be best seen in FIGS. 3 and 4 as well as in FIGS. 1 and 2, the sanitary cover 10 includes a sound permeable element or disc 30 which is adapted for overlapping engagement with the perforated central surface 22 of the telephone 12. Preferably, the sound permeable element 30 includes perforations 32 generally similar to those in the central surface 22 of the mouthpiece in order to permit the user's voice to penetrate through both the sanitary cover 10 and the adapter 18 for effective transmission by the telephone. It is incidentally noted that although there are fewer perforations in the central surface 22 of the earpiece 16 as compared to the mouthpiece, the perforated sound permeable element 30 of the sanitary cover 10 will similarly permit sound generated within the handset to be clearly transmitted to the user.

The sanitary cover 10 also includes retainer means 34 for releasably or replaceably securing the sanitary cover and the sound permeable element 30 in place upon the telephone. Preferably, the retainer means 34 is an axially extending annular flange which is integrally formed with the sound permeable element to form a unitary structure for the sanitary cover.

Referring particularly to FIG. 4, the annular flange 34 and sound permeable element 30 are formed with an interior surface 36 which generally conforms with the outer surface of either of the adapters 18 and 20. The annular flange 34 generally mates with the annularly flanged portion 24 while the sound permeable element or disc 30 generally conforms with the central surface 22. Similarly, the intersection between the annular flange 34 and sound permeable element 30 is curved in the same manner as the conforming portions of the adapters 18 and 20.

In order to better facilitate installation and removal of the sanitary cover 10 from the telephone, axially extending ribs 38 are formed on the interior surface of the annular flange 34 for engagement with the annular flange portion 24 of the telephone. An axially extending slot 40 is also formed in the annular flange 34. The slot 40 extends from the open end 42 of the annular flange 34 and tapers outwardly or widens slightly as it extends axially toward the closed end of the cover 10.

To further facilitate engagement of the sanitary cover 10 with either the mouthpiece 14 or earpiece 16, a radially inwardly facing annular bead 44 is formed on the annular flange 34 adjacent its open end 42. The exterior surface 46 of the annular flange 34 is also textured in order to permit the user to better grip the sanitary cover 10 and thus facilitate both its installation and removal from the telephone.

With the sanitary cover 10 constructed in the manner described above, the cover 10 may be rapidly slipped into place either on the mouthpiece 14 or earpiece 16 of the telephone as illustrated in FIGS. 1 and 2. As the annular flange 34 of the cover engages either of these sound transmitting portions of the telephone, the slot 40 permits the annular flange 34 to expand slightly. With the cover placed in the positive illustrated in FIG. 1, the bead 44 snaps into the groove 26 in order to better secure the cover in place upon the telephone. As was also indicated above, either the same sanitary cover 10 may be used on the earpiece 16 or another sanitary cover of similar construction may be simultaneously positioned on the earpiece so that the user is protected from transfer of bacterial or the like from either sound transmitting portion of the telephone.

The slot 40 also permits a pair of the covers 10 to be rested together in facing relation for more compact and attractive packaging prior to use.

After the user has completed the use of the telephone, the sanitary cover or covers 10 may be readily removed simply by slipping the cover 10 off of the mouthpiece or earpiece. Thus, the sanitary cover may be used repeatedly by the same user.

In order to better protect the user from bacteria, germs or the like which may be present upon the telephone, it is preferably contemplated that at least the sound permeable element 30 comprise anti-microbial material. Preferably, the entire sanitary cover 10 is formed from flexible plastic such as polyvinyl chloride or low density polyethylene. In such a case, the anti-microbial material may, for example, be a solution of 10,10'oxy-bis-phenoxarsine(OBPA) in a selected non-volatile plasticizer carrier. Such anti-microbial materials are available, for example, under the trademark VINYZENE from the Ventron Division of Morton Thiokol, Inc. and are recommended for use with polyvinyl chloride, polyurethane and other plastics and synthetic rubbers.

Relatively low concentrations of the anti-microbial material tend to provide long-term protection against a broad spectrum of bacteria or fungi. In addition, the anti-microbial material also helps to prevent surface growth, odor development, staining and embrittlement, for example. In a typical formulation, the anti-microbial material provides an active agent of about 500 parts per million in its carrier. With an anti-microbial material such as that disclosed above being mixed, for example, in the range of one part to about five parts of plastic, the final product such as the sound permeable element 30 of the sanitary cover 10 contains the anti-microbial material as an active agent in a concentration of approximately 100 parts per million.

With the sound permeable element 30 and possibly the entire sanitary cover 10 being formed from such a material, the sanitary cover may be reused many times with proper protection for the user. The cover 10 may also be washed if necessary without destroying the effectiveness of the anti-microbial material.

Although a telephone of the type illustrated in FIGS. 1 and 2 is commonly available in many public places, other telephones do not include the round adapters 18 and 20 which are particularly suited for use with the sanitary cover 10 as illustrated in FIGS. 1–4. Accordingly, another embodiment of the sanitary cover of the present invention is provided as may be generally seen at 50 in FIG. 5.

Referring to FIG. 5, the sanitary cover 50 is formed with a sound permeable element 52 which is similarly perforated at the sound permeable element 30. However, the sound permeable element 52 is generally larger and rectangular so that it will cover the sound transmitting portions of any of a wide variety of telephones, particularly telephones which may be referred to as either "trimline" or "designer" telephones.

Retainer means 54 and 56 generally conform to the retainer means 34 of FIG. 1 in that they are adapted for securing the cover in place upon any of a variety of telephones. In particular, the retainer means 54 and 56 are formed as elongated tabs extending in opposite directions from the sound peremeble element 52. Thus, the tabs 54 and 56 may be wrapped around the telephone and interconnected with each other. Preferably, the tabs are adapted for connection to each other, for example, by being formed alternately under the VELCRO trademark. However, the tabs 54 and 56 could also be of many other configurations adapted for engagement with each other.

In use, the sanitary cover 50 of FIG. 5 is positioned with its sound permeable element 52 overlapping the sound transmitting portion (not shown) of a telephone in the same manner described above in connection with FIGS. 1 and 2. The tabs 54 and 56 are then wrapped about the telephone and engaged with each other in order to secure the cover in place. Here again, after use of the telephone is complete, the cover 50 may be removed from the telephone and reused if desired.

Yet another embodiment of the invention is generally indicated in FIGS. 6 and 7 at 60. Referring particularly to FIGS. 6 and 7, the sanitary cover 60 is particularly contemplated as being a disposable cover having a sound permeable element 62 substantially similar to the sound permeable element 30 in the sanitary cover 10 of FIGS. 1–4.

Retainer means 64 for securing the sanitary cover 60 in place upon a sound transmitting portion of a telephone (not shown) comprises adhesive material 66 applied to the sound permeable element 62 in order to secure it in place upon the telephone. Preferably, the adhesive material 66 is applied to an annular ring 68 integrally formed with and encompassing the sound permeable element 62 as may be best seen in FIG. 7. Accordingly, with a sound transmitting components for telephones such as indicated either in the mouthpiece 14 or earpiece 16 of FIGS. 1 and 2, the adhesive material 66 serves to maintain the sanitary cover 60 in place. If desired, the annular ring 68 can extend beyond the adhesive material in order to assure that either the sound permeable element 62 or the annular ring 68 completely covers the sound transmitting components of the telephone. Here again, the sanitary cover 60 could also be removed from the telephone and reused if desired.

The sanitary covers 50 and 60 of FIGS. 5–7 may also be formed to include similar anti-microbial material as described above in connection with the embodiment of FIGS. 1–4.

It will be apparent that various modifications are possible within the scope of the present invention in addition to those described above in the various embodiments of FIGS. 1–7. Accordingly, the scope of the present invention is defined only by the following appended claims.

What is claimed is:

1. A unitary sanitary cover for use on sound transmitting portions of telephones having an annularly flanged component for each sound transmitting portion, comprising a sound permeable element for overlapping engagement with the sound transmitting portion of the telephone to prevent user contact therewith, retainer means adapted for releaseable engagement with the telephone to secure the sound permeable element in place on the telephone and having an annular flange for overlapping engagement with the flanged component of the telephone, an axially extending slot in said annular flange to facilitate installation on and removal from the telephone, the slot extending inwardly from an open end of said sanitary cover, a radially inwardly facing annular bead on the annular flange for snap-fit engagement over the flanged component of the telephone, an interior surface of the cover curved to conform with and better seat upon the flanged telephone component, and axially extending ribs on said interior surface for engagement with said flanged telephone component.

2. The sanitary cover of claim 1 wherein the sound permeable element comprises anti-microbial material for preventing transfer of bacteria or the like from the telephone to the user.

* * * * *